United States Patent [19]

Adams

[11] Patent Number: 4,507,793
[45] Date of Patent: * Mar. 26, 1985

[54] DIGITAL SIGNAL TRANSMISSION SYSTEM
[75] Inventor: Tello D. Adams, Seminole, Fla.
[73] Assignee: GTE Automatic Electric Incorporated, Northlake, Ill.
[*] Notice: The portion of the term of this patent subsequent to Jan. 8, 2002 has been disclaimed.
[21] Appl. No.: 450,616
[22] Filed: Dec. 17, 1982
[51] Int. Cl.³ .............................................. H04L 5/14
[52] U.S. Cl. ......................................... 375/36; 375/14; 179/2 C
[58] Field of Search ................... 375/7, 17, 36, 11, 14; 307/241, 443; 179/2 C; 333/18

[56] References Cited
U.S. PATENT DOCUMENTS

| 3,585,399 | 6/1971 | Andrews, Jr. | 375/36 |
| 3,827,026 | 7/1974 | Viswanathan | 375/36 |
| 4,083,005 | 4/1978 | Looschen | 375/36 |
| 4,101,734 | 7/1978 | Dao | 375/36 |
| 4,303,896 | 12/1981 | Slabinski | 375/36 |
| 4,337,465 | 6/1982 | Spracklen et al. | 370/85 |

Primary Examiner—Robert L. Griffin
Assistant Examiner—Stephen Chin
Attorney, Agent, or Firm—Robert J. Black; Gregory G. Hendricks

[57] ABSTRACT

A signal transmission system which allows digital signals to be transmitted over twisted pair transmission lines. Master and slave transmission circuits are located at the switching system and terminal ends, respectively, of the transmission line. Both circuits include transmit and receive circuitry. The transmit circuitry includes a summing circuit connected to a constant current generator and the receive circuit includes an adaptive equalization/automatic gain control circuit connected between a differential amplifier and a slicer circuit.

28 Claims, 3 Drawing Figures

DIGITAL SIGNAL TRANSMISSION SYSTEM

CROSS-REFERENCE TO RELATED APPLICATION

A copending and concurrently filed U.S. patent application Ser. No. 450,615, is related to the present invention. That application is also titled "Interface Circuit for Digital Signal Transmission System". The inventions claimed in both applications were invented by the same inventor and assigned to the same assignee.

FIELD OF THE INVENTION

The present invention relates to transmission systems and more particularly to a system for transmitting digital signals over analog, twisted pair transmission lines.

BACKGROUND OF THE INVENTION

For many years, it has been conventional practice to interconnect telephone instruments to central switching devices such as private automatic branch exchanges, key systems and the like by inexpensive twisted pair tranmission lines. These transmission lines consist of two elongated insulated conductors which are twisted together along their lengths. The instruments and switching devices, until very recently, utilized low frequency analog signals typically in a frequency range of 0–4 KHZ. The twisted pair transmission lines were not only inexpensive and technically acceptable for transmitting such signals but they could also be installed and removed or replaced easily and inexpensively.

New telephone instruments and other types of equipment incorporating telephone functions, now referred to as terminals, as well as new central switching devices utilize digital rather than analog signals. However, the signal transmission parameters of twisted pair transmission lines are inadequate for digital signal transmission. If twisted pair transmission lines are used to transmit digital signals, excessive signal degradation results. Such signal degradation can be corrected by connecting expensive equipment to these lines, but twisted pair transmission lines are still unsuitable for general use in transmitting digital signals because of the high cost of such equipment.

When digital equipment is to be installed with new transmission facilities it is customary to use coaxial cables, rather than twisted pair transmission lines since coaxial cables have signal transmission parameters which are suited to transmitting digital signals. However, when twisted pair transmission lines have already been installed, expensive and time consuming replacement procedures are required to remove these lines and replace them with coaxial cables.

The present invention overcomes the requirement of such replacement procedure by providing new and inexpensive equipment which cooperates with a twisted pair transmission line in such manner that it can be used to transmit digital signals over extended distances, e.g. several miles, without causing appreciable signal degradation.

SUMMARY OF THE INVENTION

In accordance with the present invention, an interface circuit for digital signal transmission system is provided for use between first and second digital signaling devices. Each device is operative to provide digital device signals of first, second and third characteristics. The digital signal transmission system includes first and second line interface devices connected to the first and second digital signaling devices, respectively. It also includes a transmission line connected between the first and second line interface devices. The first and second line interface devices are both operative in response to the digital device signal of the first characteristic to provide bias current in the transmission line. Each line interface device is further operative in response to the digital device signals of the second and third characteristics to modulate the bias current with modulation signals of first and second characteristics, respectively.

The transmission line attenuates and distorts the bias current and the modulation signals of first and second characteristics. Each of the line interface devices is further operative to compensate for the transmission line attenuation and distortion. Each line interface device is further operative in response to the bias current to provide a digital interface signal of a first characteristic. Each line interface device is further operative in response to the attenuated and distorted modulation signals of the first and second characteristics to provide digital interface signals of second and third characteristics, respectively.

Each digital signaling device is further operative to receive the digital interface signals of first, second and third characteristics.

DESCRIPTION OF THE PREFERRED EMBODIMENT

Figure 1:
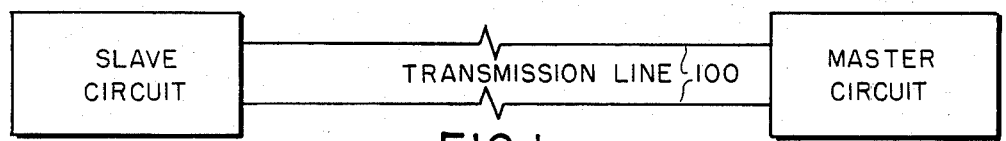
FIG. 1 of the accompanying drawing is a block diagram of the interface circuit for digital signal transmission system of the present invention.
Figure 2:
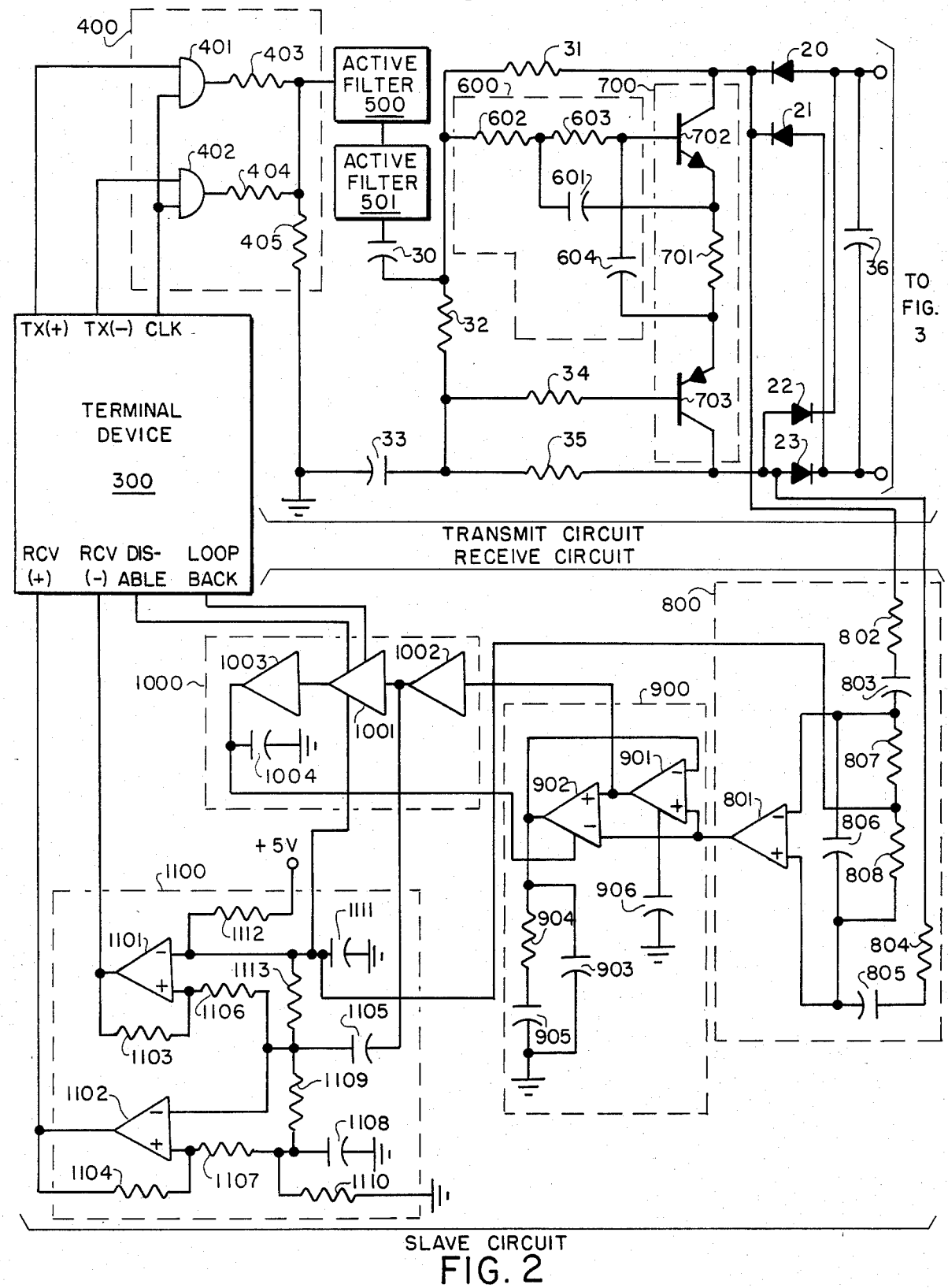
FIG. 2 of the accompanying drawing is a schematic diagram of the slave circuit shown in FIG. 1.
Figure 3:
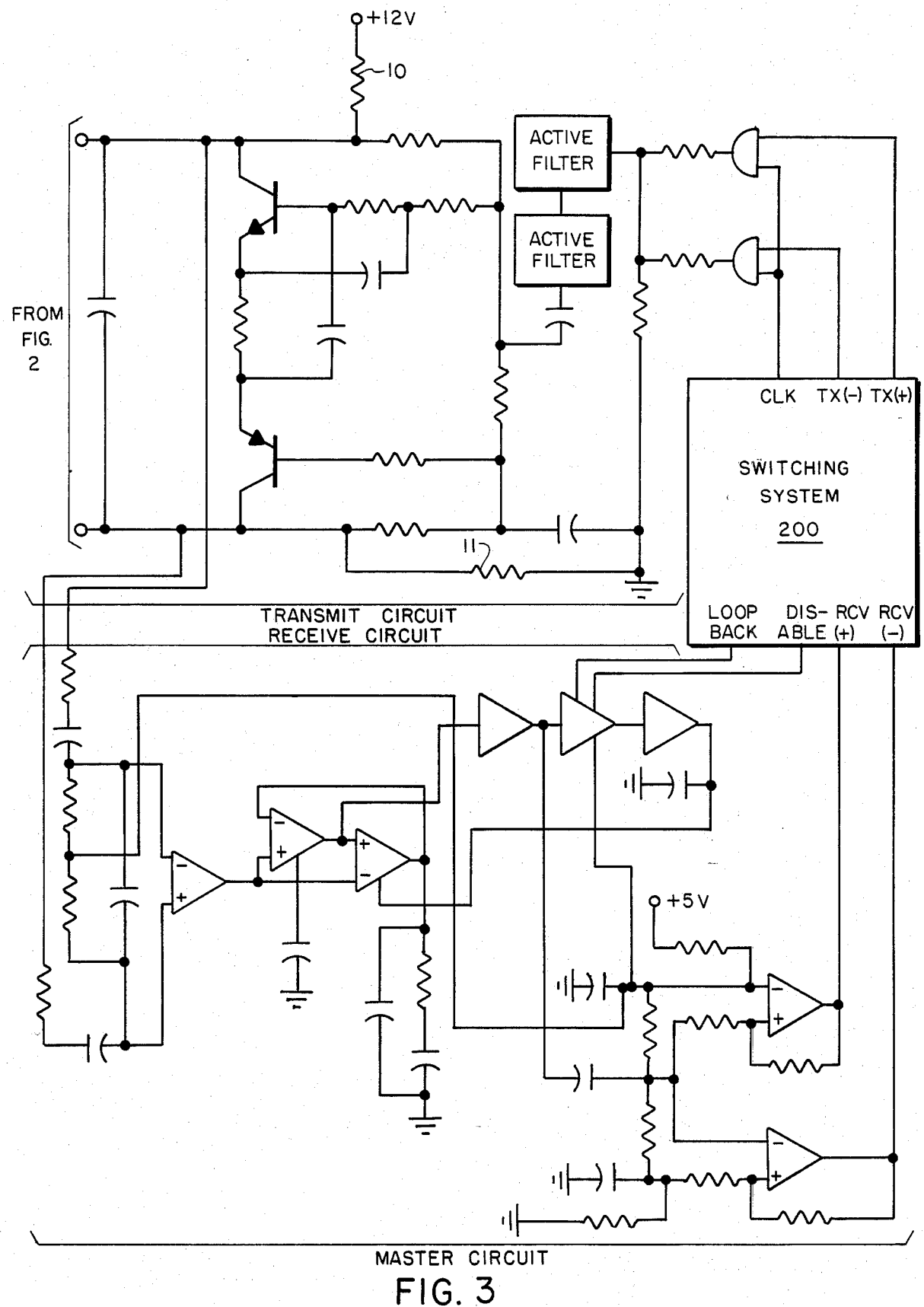
FIG. 3 of the accompanying drawing is a schematic diagram of the master circuit shown in FIG. 1.

Referring now to the accompanying drawing, the interface circuit for digital signal transmission system of the present invention is shown. This system includes a master circuit (first line interface device), connected between transmission line 100 having first and second wires, and switching system 200 (first digital signaling device). It also includes a slave circuit (second line interface device) connected between transmission line 100 and terminal device 300 (second digital signaling device). The master and slave circuits are identical except for power supply circuitry. The master circuit includes a 12 volt power supply and power and ground resistors 10 and 11, respectively. This circuitry does not exist in the slave circuit. However, the slave circuit includes diode bridge 20–23 (current directional means) which does not exist in the master circuit.

Both the master circuit and the slave circuit include transmit and receive circuits. While the circuitry of both the master and slave circuits is shown on the accompanying drawings, numerical references and operational descriptions are provided only for the transmit and receive circuits of the slave circuit. The slave transmit circuit includes summing circuit 400, active filters 500, and 501, passive filter 600, current generator 700 and resistor capacitor network 30–35. The slave receive circuit includes receiver 800, adaptive equalization/automatic gain control circuit 900, peak detector circuit 1000 and slicer 1100.

Summing circuit 400 is connected between terminal device 300 and active filter 500 which is further connected to active filter 501. Filter 501 is further connected to first coupling capacitor 30 which is connected to the junction of first and second bias resistors 31 and 32, respectively. Passive filter 600 is connected between capacitor 30 and balanced current generator 700. Resistor 32 is connected to the junction of balancing resistor 34, second coupling capacitor 33 and third bias resistor 35. Capacitor 33 and summing circuit 400 are also connected to each other and to ground.

Summing circuit 400 includes AND gates 401 and 402, each having a first input connected to the positive and negative transmit, TX (+) and TX (−) terminals, respectively, of terminal device 300. The second input of each of these gates is connected to the clock (CLK) terminal of terminal device 300. Gates 401 and 402 each have their output connected to resistors 401 and 402, respectively. These resistors are both further connected to summing resistor 403. Active filters 500 and 501 both typically include an amplifier and a resistor capacitor network connected in a feedback arrangement. Such filters are old and well known. Passive filter 600 includes capacitor 601 connected to the junction of resistors 602 and 603. Resistor 603 is also connected to capacitor 604. Current generator 700 includes regulatory resistor 701 connected between the emitters of first and second transistors, 702 and 703, respectively. These emitters are further connected to capacitors 601 and 604, respectively. The base of transistor 702 is connected to the junction of resistor 603 and capacitor 604, while the series combination of resistors 34 and 35 is connected across the base and collector of transistor 703. The collectors of these transistors are connected to diode bridge 20–23, capacitor 36 and transmission line 100.

Receiver 800 includes differential amplifier 801 which has positive (+) and negative (−) inputs. This receiver operates to reject common mode noise. The negative input is connected to the positive rectified side of transmisson line 100 (junction of diode 20 and 21) via resistor 802 and capacitor 803. The positive input is connected to the negative rectified side of transmission line 100 via resistor 804 and capacitor 805. Capacitor 806 and the series combination of resistors 807 and 808 are connected across the positive and negative inputs of amplifier 801.

Adaptive equalization/automatic gain control circuit 900 includes equalization amplifier 901 and gain control amplifier 902, each having an output and positive (+), negative (−) and control inputs. The positive input of equalization amplifier 901 and the negative input of gain control amplifier 902 are both connected to the output of differential amplifier 801, while the positive input of gain control amplifier 902 is connected to the output of equalization amplifier 901. The negative input of equalization amplifier 901 is connected to the output of gain control amplifier 902. This output is also connected to equalization network 903–905 which is also connected to ground. The control input of equalization amplifier 901 is connected to capacitor 906 which is also connected to ground.

Peak detector circuit 1000 includes peak detector amplifier 1001 connected between input and output amplifiers 1002 and 1003, respectively. The output of amplifier 1003 is connected to the control input of gain control amplifier 902 and capacitor 1004 which is also connected to ground. The two control inputs of peak detector amplifier 1001 are connected to the loop back and disable terminals of terminal device 300.

Slicer 1100 includes positive and negative comparators 1101 and 1102 whose positive (+) inputs are connected to their associated output via first and second feedback resistors 1103 and 1104, respectively. The negative (−) input of comparator 1102 is connected to isolation capacitor 1105 and to resistor 1106 which is connected to the positive input of comparator 1101. The positive input of comparator 1102 is connected via resistor 1107 to the junction of capacitor 1108 and resistors 1109 and 1110. The negative (−) input of comparator 1101 is connected to the junction of capacitor 1111 and resistors 1112 and 1113. Resistor 1110 and capacitors 1108 and 1111 are connected to ground while resistor 1112 is connected to the +5 volt power source. The outputs of comparators 1101 and 1102 are connected to the positive and negative receive, RCV (+) and RCV (−) inputs, respectively, of terminal device 300. The junction of resistors 1112 and 1113 is connected to the control input of peak detector amplifier 1001 and the junction of resistors 807 and 808.

Since the master circuit is identical to the slave circuit, except for power circuitry, operation of the present invention is described with reference to the slave circuit. The 12 volt power supply provides power to both the master and salve circuits. This power flows to the slave circuit from the 12 volt supply via resistor 10 and transmission line 100. The current from this power supply is then returned to ground via transmission line 100 and resistor 11.

When terminal device 300 transmits data to switching system 200 (e.g. a telephone central office), it applies selected patterns of digital data bits (logic levels 1 and 0) to the positive, TX (+), and negative, TX (−), transmit terminals. Data is transmitted over transmission line 100 under a trilevel, alternate mark inversion (AMI) arrangement. Under this arrangement, there are three states of valid signals, positive, negative and zero. Since three signaling states are required to transmit data under this arrangement, terminal device 300 must apply two data bits to summing circuit 400, via the TX (+) and TX (−) outputs, to define each signal to be transmitted over transmission line 100. The logical relationship between the various data bit patterns, provided by terminal device 300, and the associated resultant signals transmitted over transmission line 100 are listed in TABLE 1.

TABLE 1

| First Data Bit | Second Data Bit | Transmission Line Signal |
|---|---|---|
| 1 | 0 | High (positive) |
| 0 | 0 | Zero |
| 0 | 1 | Low (negative) |

However, since the High, Zero and Low signals are represented by signals of successively decreasing magnitude, the signals appearing at the TX (+) and TX (−) terminals, when summed by summing circuit 400, must also be of successively decreasing magnitude. Therefore, the signals intended to appear at the TX (−) terminal are inverted within terminal device 300. Accordingly, the actual signals appearing at the TX (+) and TX (−) terminals and the resultant transmission line signals are listed in TABLE 2.

TABLE 2

| TX (+) | TX (−) | Transmission Line Signal |
|---|---|---|
| 1 | 1 | High |
| 0 | 1 | Zero |
| 0 | 0 | Low |

The combination of signals appearing at the TX (+) and TX (−) terminals which correspond to the High, Zero and Low transmission line signals, represent digital device signals of second, first and third characteristics, respectively. Also, the Zero, High and Low transmission line signals represent bias current, modulation signal of a first characteristic and modulation signal of a second characteristic, respectively. Similarly, corresponding combinations of receive signals appearing at the RCV (+) and RCV (−) terminals are provided by the receive circuit in response to these Zero, High and Low level transmission line signals. These receive signals represent digital interface signals of first, second and third characteristics.

Bias or zero level current flows from the +12 volt power supply, through resistor 10, and transmission line 100. This current then flows to ground through the slave transmit circuit, transmission line 100 and resistor 11. Diode bridge 20-23 ensures that the bias signal is always of the polarity required for the slave transmit circuit to operate properly. Bias resistors 31, 32 and 35 provide bias current for current generator 700 and thereby control the transmission line bias current. Resistor 34 balances the impedance of filter 600 and thereby cancels any transmission line noise, that is coupled through the basecollector capacitances of transistors 701 and 702. For noise reduction and grounding purposes both the master and slave circuits must be isolated from the line. This is accomplished in the transmit circuits by transistors 702 and 703, and in the receive circuits by blocking capacitors 803 and 805.

The transmission technique used for these applications consists of modulated signals is superimposed upon the bias current delivered to the load through resistors 10 and 11. When transmitting from switching system 200 the modulated current develops a differential voltage across resistors 10 and 11. This voltage is received by receiver 800 in the slave circuit. The use of a differential technique to both transmit and receive, over twisted pair, greatly enhances the signal-to-noise ratio as most noise pickup appears as a common mode signal. By using this technique line resistance has only a minor effect due to the high terminating impedance presented by transistors 702 and 703, and resistors 802 and 804. When transmitting from the terminal end, the same type of modulation is used and a resultant voltage is again developed across resistors 10 and 11. This voltage is then detected by a receiver in the master circuit. Since the actual transmission vehicle is current in one direction and voltage applied to a very high impedance in the other direction, line resistance has little effect. The principal degradation, due to the transmission line, occurs at the higher frequencies and is caused by the transmission line's frequency response and group delay characteristics.

When terminal device 300 is transmitting, it provides various logic level 1 and 0 signals, as shown in Table 2, at its TX (+) and TX (−) terminals. AND gates 401 and 402 gate these logic level 1 and 0 signals to resistors 403 and 404 when a clock signal appears at the CLK terminal of terminal device 300. These gated signals cause corresponding levels of current to flow through resistor 405 via resistors 403 and 404. The resultant voltage developed across resistor 405 is variable since it represents the various sums of the signals appearing at the TX (+) and TX (−) terminals. This variable resultant voltage represents first, second and third current control signals and corresponds to the digital device signals of first, second and third characteristics, respectively. This resultant voltage causes a corresponding current to flow through active filters 500 and 501, capacitor 30 and passive filter 600. Active filter 500 is a second order filter and is effective at low frequencies in the four kilobit/second (4 kb/s) range. Active filter 501 is also a second order filter and provides effective filtering in the 64 kb/s to 256 kb/s range. Filter 600 provides additional filtering in order to meet stringent electromagnetic interference (EMI) requirements at these higher frequencies.

This filtered current from filter 600 is then applied to the base of transistor 702 in current generator 700. Since transistor 702 is connected to transistor 703, current flow in transistor 702 causes current to flow in transistor 703 also. These transistors, in combination with resistor 701, operate as a differential current generator since any variations in drive voltage causes a corresponding change in the voltage across resistor 701 and a proportional change in the current outputs of transistors 702 and 703. Current generator 700 applies alternate-mark-inversion (AMI) signals to transmission line 100 by modulating the bias current flowing in the transmission line.

In summary, when terminal device 300 provides logic level 0 and 1 signals at the TX (+) and TX(−) terminals, respectively, (Zero transmission line signal) those signals are summed, filtered and applied to current generator 700 which maintains the bias current in, and prevents any voltage drop across, transmission line 100. The level of this bias current is defined by resistors 31, 32 and 34 which control transistors 702 and 703. When terminal device 300 provides logic level 1 signals at both the TX (+) and TX (−) terminals, (High transmission line signal) current generator 700 modulates the bias current in transmission line 100 by increasing the level of such current. Similarly when terminal device 300 provides logic level 0 signals at both the TX (+) and TX (−) terminals, (Low transmission line signal) current generator 700 modulates the bias current in transmission line 100 by decreasing the level of such current.

When the bias level current flows in transmission line 100, the voltage drops across resistors 10 and 11 are equal. The voltages across these resistors are detected at the positive (+) and negative (−) inputs of receiver amplifier 801. Capacitors 803 and 805 block any direct current (DC) component of those voltages and resistors 802 and 804 limit the transmission line current drained by the receive circuit. Resistors 807 and 808 provide direct current (DC) bias for the positive and negative inputs of differential amplifier 801. This DC bias is derived from the +5 volt supply via resistor 1112. Capacitor 806 operates as a low pass input filter. Any common mode noise is thus rejected under this type of configuration of differential amplifier 801. Thus the receive circuit operates as a common mode noise rejection receiver. Three receiver output signals are provided by this amplifier. These receiver signals of first, second and third characteristics, correspond to the Zero, High and Low transmission line signals.

These signals are then applied to adaptive equalization/automatic gain control circuit 900. This circuit is configured as a high pass filter with characteristics equal and opposite to the low pass characteristics of transmission line 100. These characteristics are provided by equalization network 903–905. Thus, equalization/automatic gain control circuit 900 is an adaptive circuit and it automatically compensates for the attenuation and distortion caused by transmission line 100. Compensation capacitor 906 causes the high frequency response of this circuit to roll off and thereby limit any noise amplification.

Peak detector amplifier 1001 has its control input conneted to a voltage reference defined by the +5 volt power supply and resistor 1112 in slicer circuit 1100. This peak detector amplifier provides a positive adjustment in its output signal when the signal it receives from equalization amplifier 901, as amplified by input amplifier 1002, exceeds the reference voltage. This output signal is then amplified, by amplifier 1003, and applied to the control input of automatic gain amplifier 902. Automatic gain amplifier 902 then increases its gain, and causes a signal of increased amplitude to appear at the negative input of equalization amplifier 901. The output signal from equalization amplifier 901 then decreases, causing the output from peak detector amplifier 1001 to decrease. Similarly, if the signal received from equalization amplifier 901 is less than the reference voltage, peak detector amplifier 1001 provides a negative adjustment in the output signal causing automatic gain amplifier 902 to decrease its gain. The output signal from equalization amplifier 901 then increases and causes the signal from peak detector amplifier 1001 to increase. Such continuous adjustments in gain allow adaptive equalization/automatic gain control circuit 900, in combination with peak detector circuit 1000, to compensate for the attenuation and distortion caused by transmission line 100.

The equalized and compensated signal from equalization/amplifier 901, as amplified by input amplifier 1002, is then applied to slicer 1100. Capacitor 1105 blocks DC voltage and thereby causes the equalized and amplified receiver signal to be referenced to the DC voltage appearing at the junction of resistors 1109 and 1113. Thus the center point of the equalized and amplified receiver signal is defined by voltage divider resistors 1109, 1110, 1112 and 1113, and the voltage appearing at the junction of resistors 1109 and 1113 provides a reference about which the amplitude of the equalized and amplified receiver signal varies. Comparators 1101 and 1102 slice the amplified receiver signal by comparing it to predetermined reference voltages. The reference voltage for comparator 1101 is defined by resistors 1112 and 1113, as filtered by capacitor 1111. The reference voltage for comparator 1102 is defined by resistors 1109 and 1110, as filtered by capacitor 1108.

When the signal appearing at the positive (+) input of comparator 1101 exceeds the reference voltage appearing at its negative (−) input, a logic level 1 signal appears at the output of comparator 1101. Similarly, when the signal appearing at the negative (−) input of comparator 1102 is less than the reference voltage appearing at its positive (+) input, a logic level 1 signal appears at the output of comparator 1102. These logic level 1 first and second comparator signals, and the absence of both signals, represent digital interface signals of second, third and first characteristics which correspond to the high, low and zero transmission line signals, respectively. Resistors 1103 and 1104 provide the hysteresis necessary to limit false or multiple output signals due to any noise that is not attenuated by equalization/automatic gain control circuit 900.

The loopback and disable signals from terminal device 300 (and switching system 200) provide overall control of the receive circuits. The disable signal causes peak detector amplifier 1001 to inhibit its output signal and thereby cause gain amplifier 902 to apply its maximum output signal to the negative input of equalization amplifier 901. The output signal from equalization amplifier 901 is the inhibited and so are the output signals from slicer circuit 1100. The disable signal is capable of rendering the receive circuits inoperative. This signal is typically used when terminal device 300, or switching system 200 is transmitting.

The loopback signal is used for maintenance purposes and allows the transmitted signals, appearing at the TX (+) and TX (−) terminals, to appear at the RCV (+) and RCV (−) terminals, respectively, and thereby verify operation of the transmit and receive circuits. Peak Detector 1001 operates normally in response to this loopback signal.

Thus the interface circuit for digital signal transmission system of the present invention allows digital signals to be transmitted over a twisted pair transmission line through use of a differential current generator and receiver located at both ends of the line.

It will be obvious to those skilled in the art that numerous modifications of the present invention can be made without departing from the spirit of the invention which shall be limited only by the scope of the claims appended hereto.

What is claimed is:

1. An interface circuit for digital signal transmission system for use between first and second digital signaling devices, each device being operative to provide digital device signals of first, second and third characteristics, said digital signal transmission system comprising:

first and second line interface devices connected to said first and second digital signaling devices, respectively;

a transmission line connected between said first and second line interface devices;

each of said first and second line interface devices being operative in response to said digital device signal of said first characteristic to provide bias current in said transmission line; and each being further operative in response to said digital device signals of said second and third characteristics to modulate said bias current with modulation signals of first and second characteristics, respectively;

said transmission line being operative to attenuate and distort said modulation signals of first and second characteristics;

each of said first and second line interface device being further operative to compensate for said transmission line attenuation and distortion and further operative in response to said bias current to provide a digital interface signal of a first characteristic and each being further operative in response to said attentuated and distorted modulation signals of said first and second characteristics to provide digital interface signals of second and third characteristics, respectively;

said digital signaling devices each being further operative to receive said digital interface signals of said first, second and third characteristics.

2. A digital signaling interface circuit as claimed in claim 1, wherein said first and second line interface devices comprise:
   first and second transmitting means, respectively, each connected between said transmission line and said associated digital signaling device, and both operative in response to said digital device signal of said first characteristic to provide said transmission line bias current, and each further operative in response to said digital device signals of said second and third characteristics to provide said modulation signals of said first and second characteristics, respectively.

3. A digital signaling interface circuit as claimed in claim 1, wherein said first and second line interface devices comprise:
   first and second receiving means respectively, each connected between said transmission line and said associated digital signaling device, and each operative to compensate for said transmission line attenuation and distortion and further operative in response to said bias current to provide said digital interface signal of said first characteristic, and each further operative in response to said distorted and attenuated modulation signals of said first and second characteristics to provide said digital interface signals of said second and third characteristics, respectively.

4. A digital signaling interface circuit as claimed in claim 1, wherein said first line interface device comprises a source of power for said transmission line bias current and said modulation signals of first and second characteristics.

5. A digital signaling interface circuit as claimed in claim 1, wherein said second line interface device comprises current directional means being operative to cause said transmission line bias current to be unidirectional within said second line interface device.

6. A digital signaling interface circuit as claimed in claim 2, wherein said first transmitting means comprises a source of power for said transmission line bias current and said first and second modulation signals.

7. A digital signaling interface circuit as claimed in claim 2, wherein said second transmitting means comprises current directional means being operative to cause said transmission line bias current to be unidirectional within said second transmitting means.

8. A digital signaling interface circuit as claimed in claim 7, wherein said current directional means comprises a diode bridge.

9. A digital signaling interface circuit as claimed in claim 2, wherein said digital device signals of said first, second and third characteristics, are each represented by a plurality of different digital data bits, said first and second transmitting means each comprising:
   summing means connected to said first and second digital signal devices, respectively, and operative in response to said plurality of data bits representing said digital device signals of said first, second and third characteristics to provide first, second and third current control signals respectively; and
   current generating means connected to said summing means and operative in response to said first, second and third current control signals to provide said transmission line bias current and said modulation signals of said first and second characteristics, respectively.

10. A digital signaling interface circuit as claimed in claim 9, wherein there is further included: filter means connected between said summing means and said current generating means and operative to filter said current control signals of said first, second and third characteristics; said current generating means being operative in response to said filtered current control signals of said first, second and third characteristics to provide said transmission line bias current and said modulation signals of said first and second characteristics, respectively.

11. A digital signaling interface circuit as claimed in claim 9, wherein said summing means comprises:
   first and second resistors connected to a common junction and to said digital signaling device; and
   a third resistor connected between said common junction and ground.

12. A digital signaling interface circuit as claimed in claim 9, wherein said current generating means comprises a transistor connected to a resistor.

13. A digital signaling interface circuit as claimed in claim 9, wherein said transmission line includes first and second wires, said current generating means comprising: a regulatory resistor;
   first and second transistors each having base, collector and oppositely poled emitters; said collectors of said first and second transistors being connected to said first and second wires, respectively, said regulating resistor being connected between said first and second emitters; a first bias resistor connected across said first base and first collector; a second bias resistor connected between said first and second bases; and a third bias resistor connected across said second base and collector; said second and third bias resistors being further connected to a common junction.

14. A digital signaling interface circuit as claimed in claim 10, wherein there is further included: a first signal coupling capacitor connected between said filter means and said summing means.

15. A digital signaling interface circuit as claimed in claim 13, wherein there is further included a second signal coupling capacitor connected between ground and said junction between said second and third bias resistors.

16. A digital signaling interface circuit as claimed in claim 13, wherein there is further included, an impedance balancing resistor connected between said second base and said junction between said second and third bias resistors.

17. A digital signaling interface circuit as claimed in claim 3, wherein said receiving means comprises:
   a common mode noise rejection receiver connected to said transmission line and operative in response to said bias current and said distorted and attenuated modulation signals of said first and second characteristics to provide receiver signals of first, second and third characteristics, respectively; and
   signal slicing means having an input lead connected to said common mode noise rejection receiver and a pair of outputs connected to said digital signaling device, said slicing means being operative in response to said receiver signals of first, second and third characteristics to provide said digital interface signals of first, second and third characteristics, respectively.

18. A digital signaling interface circuit as claimed in claim 17, wherein said transmission line includes first and second wires, said common mode noise rejection receiver comprising:

a differential amplifier having an output and first and second inputs connected to said first and second wires, respectively, and operative to receive said bias current and said attenuated and distorted modulation signals of first and second characteristics.

19. A digital signaling interface circuit as claimed in claim 18, wherein said common mode noise rejection receiver further comprises: an equalization circuit connected to the output of said differential amplifier and operative to compensate said received modulation signals of first and second characteristics for said transmission line distortion and attenuation and thereby provide said receiver signals of second and third characteristics, respectively.

20. A digital signaling system as claimed in claim 19, wherein a voltage reference source is further included, said equalization circuit comprising:

an equalization amplifier having an output and first and second inputs, said first input being connected to the output of said differential amplifier;

an automatic gain control amplifier having an output and a first input, said first input being connected to the output of said equalization amplifier and a second input connected to the output of said differential amplifier; said second input of said equalization amplifier being connected to the output of said automatic gain control amplifier; and a peak detector amplifier having an output and a data input, said data input being connected to said equalization amplifier and said peak detector amplifier also having a control input connected to said voltage reference source, said automatic gain control amplifier further having a control input connected to the output of said peak detector amplifier.

21. A digital signaling interface circuit as claimed in claim 20, wherein there is further included, a storage capacitor connected to said peak detector.

22. A digital signaling interface circuit as claimed in claim 20, wherein said equalization amplifier further includes an equalization control input, said equalization circuit further comprising a filter capacitor connected to said equalization control input.

23. A digital signaling interface circuit as claimed in claim 20, wherein there is further included, a filter circuit connected to said automatic gain control amplifier.

24. A digital signaling interface circuit as claimed in claim 17, wherein there is further included sources of first and second reference voltages, said signal slicing means comprising:

first and second comparators each having first and second inputs, said second input of said first comparator connected to said first input of said second comparator and to said common mode noise rejection receiver;

said first input of said first comparator and said second input of said second comparator being connected to said first and second sources of said reference voltages, respectively;

said first comparator being operative to provide a first comparator signal when said receiver signal exceeds said first reference voltage, said second comparator being operative to provide a second comparator signal when said receiver signal is less than said second reference voltage;

whereby said digital interface signals of first, second and third characteristics are represented by said first comparator signal, said second comparator signal, and an absence of said first and second comparator signals, respectively.

25. A digital signaling interface circuit as claimed in claim 24, wherein: there is further included, first and second feedback resistors connected across the output and second input of each comparator.

26. A digital signaling interface circuit as claimed in claim 17, wherein said signal slicing means further comprises an isolation capacitor connected to said common mode noise rejection receiver.

27. A digital signaling interface circuit as claimed in claim 11, wherein there is further included: first and second gating circuits connected to said first and second resistors, respectively, and further connected to said digital signaling device, said digital signaling device being operative to periodically provide a clock signal, said first and second gating circuits being operative in response to said clock signal and said data bits representing digital device signals of first, second and third characteristics to provide gated data bits of first, second and third characteristics, respectively, said summing means being operative in response to said gated data bits of first, second and third characteristics to provide said first, second and third control signals, respectively.

28. A digital signaling interface circuit as claimed in claim 14, wherein said filter means comprises first and second series connected filter resistors connected between said first coupling capacitor and the base of said first transistor;

a first capacitor connected between the emitter of said first transistor and the junction of said first and second filter resistors; and a second capacitor connected between the base of said first transistor and the emitter of said second transistor.

* * * * *